United States Patent [19]

Vdoviak et al.

[11] Patent Number: 4,989,406
[45] Date of Patent: Feb. 5, 1991

[54] TURBINE ENGINE ASSEMBLY WITH AFT MOUNTED OUTLET GUIDE VANES

[75] Inventors: John W. Vdoviak, Marblehead, Mass.; Roy E. Moyer, Cincinnati, Ohio; Dennis C. Evans, Topsfield, Mass.

[73] Assignee: General Electric Company, Cincinnati, Ohio

[21] Appl. No.: 291,840

[22] Filed: Dec. 29, 1988

[51] Int. Cl.[5] .............................................. F02K 3/10
[52] U.S. Cl. .................................... 60/261; 60/39.161; 60/39.31; 415/142; 415/209.1
[58] Field of Search ............... 60/39.31, 261, 39.161, 60/39.5; 415/208.1, 209.1, 211.2, 142, 138

[56] References Cited

U.S. PATENT DOCUMENTS

| | | |
|---|---|---|
| 2,869,941 | 1/1959 | Shoup, Jr. et al. ............. 415/142 |
| 2,919,888 | 1/1960 | Simmons ...................... 60/39.32 |
| 2,928,648 | 3/1960 | Haines et al. ................. 415/138 |
| 2,930,662 | 3/1960 | Henstridge ................... 60/39.31 |
| 2,938,336 | 5/1960 | Peterson . | |
| 3,104,525 | 9/1963 | Shields . | |
| 3,261,587 | 7/1966 | Rowley ....................... 415/138 |
| 3,286,982 | 11/1966 | Scheper, Jr. ................ 60/39.161 |
| 3,313,105 | 4/1967 | Johnson ...................... 415/142 |
| 3,403,889 | 10/1968 | Ciokajlo . | |
| 3,824,031 | 7/1974 | Gilbert ....................... 415/138 |
| 3,826,088 | 7/1974 | Nash et al. . | |
| 3,902,314 | 9/1975 | Straniti ....................... 60/39.31 |
| 4,369,016 | 1/1983 | Dennison . | |
| 4,478,551 | 10/1984 | Honeycutt et al. . | |

Primary Examiner—Donald E. Stout
Attorney, Agent, or Firm—Jerome C. Squillaro

[57] ABSTRACT

A turbine assembly includes an annular fairing and strut subassembly which provides mechanical strength to the turbine assembly and support for the rotor aft bearing. A readily demountable annular outlet guide vane assembly is mounted to the aft of the fairing and strut assembly for deswirling the exhaust gasses which exit the turbine assembly. The aft mounting of the outlet guide vanes allows for an axially shorter and lighter turbine engine design which removes greater inlet swirl than prior designs, with equal or less pressure loss.

16 Claims, 9 Drawing Sheets

TURBINE ENGINE ASSEMBLY WITH AFT MOUNTED OUTLET GUIDE VANES

BACKGROUND OF THE INVENTION

1. Field of the Invention

This invention relates generally to a turbine assembly and particularly relates to a gas turbine engine assembly which incorporates thin structural support struts aligned with the exit swirl from a low pressure gas turbine, and which includes an array of outlet guide vanes mounted aft of the struts for deswirling the exhaust gasses.

2. Description of Prior Developments

The advent of high temperature turbine engines has increased the emphasis on single-stage high energy extraction turbine engine designs. Single stage turbine engines are particularly desirable in aircraft applications because single stage turbine engines are lower in weight and easier to maintain than counterpart multistage designs. However, single stage designs have traditionally posed several problems of their own including an increased amount of swirl or vorticity in the exhaust gasses. This swirl is particularly prevalent in medium and high bypass ratio designs where the ratio of the fan duct mass flow to the main duct mass flow is relatively high.

For increased bypass ratio turbine engines the low pressure turbine is subjected to increased loading resulting in high exit swirl. That is, the airflow exiting the low pressure turbine has a relatively high tangential velocity, in the order of thirty degrees or greater. In order to avoid large thrust losses, this swirl must be straightened before the hot exhaust gasses are discharged from the exhaust system.

One conventional approach to removing or straightening this swirl has been to mount a row of deswirl or outlet guide vanes directly behind the low pressure turbine rotor and ahead of or co-planar with the structural support struts and fairings. Another known approach combines the structural support struts and outlet guide vanes into a limited number of relatively long airfoil shaped members.

In addition to removing swirl from the gasses exiting the low pressure turbine it is also desirable to closely couple the high pressure and low pressure turbine bearing supports and associated structural frames to minimize the size and weight of the engine and to increase the stiffness of the low pressure rotor. By closely supporting or coupling the high pressure and low pressure turbine bearings, the axial distance between these bearings can be reduced and size and weight reductions can be achieved. It is further desirable to minimize the axial distance between the low pressure turbine rotor and the aft structural frame which supports the aft bearing for the same reasons, i.e., to achieve a reduced engine envelope and reduced weight and to increase rotor stiffness.

Prior single stage turbines have employed an array of outlet guide vanes located upstream or ahead of the aft bearing structural frame or have combined or integrated the outlet guide vanes within the aft bearing structural frame. Each approach presents its own drawbacks. By mounting the outlet guide vanes ahead of the aft bearing structural frame, the axial length of the rotor system must be increased since the aft bearing structural frame must be positioned further aft to accommodate the additional axial extent of the outlet guide vanes. Combining the outlet guide vanes with the aft bearing structural frame requires the presence of many long radially extending outlet guide vanes which are difficult to cool. This approach further requires wider or thicker outlet guide vanes for structural strength resulting in higher aerodynamic turning and drag pressure losses.

In order to increase the thrust output of a turbine engine an augmentor or afterburner may be provided downstream from the low pressure turbine, typically within the exhaust duct of the engine. Additional fuel may be injected into the exhaust duct and ignited to provide an additional high energy gas stream which may be mixed with fan bypass air and then ejected through an exhaust nozzle system to provide an extra high energy thrust output from the engine.

It is most important that the high velocity gases flowing into the afterburner have been previously straightened or deswirled by the outlet guide vanes so that these gases may be effectively diffused. The even and complete diffusion of the exhaust gases is necessary to maximize the combustion of the oxygen contained within the gases as they flow through the afterburner.

Some prior turbine engine designs located the outlet guide vanes across the exhaust flowpath ahead of mechanical support struts which formed part of the structural frame supporting the low pressure turbine aft bearing. These support struts not only supported the aft bearing and internal rotor shaft, but also provided internal passages for radially directing cooling airflow and engine oil through the support struts. Airfoil contoured shields covering the support struts reduced their aerodynamic drag and assisted the diffusion process. Although the outlet guide vanes removed the swirl, they nevertheless created large drag effects due to the high Mach number flow which is present directly adjacent the low pressure turbine exit where the outlet guide vanes were mounted.

Other prior turbine engine designs have used cambered airfoils to simultaneously deswirl the exhaust gasses and shield the mechanical support struts. Because of the large cross sections required of the mechanical support struts, these shielded designs required relatively thick shields with long axial lengths. These designs resulted in substantial drag effects and incomplete swirl removal. In effect, the thicker the strut supports and/or the outlet guide vanes, the greater the flow blockage, the greater the pressure loss and the greater the loss of thrust.

SUMMARY OF THE INVENTION

The present invention has been developed to solve the problems noted above and therefore has as a primary object the provision of an outlet guide vane assembly which is mounted aft of the mechanical support struts of the turbine aft bearing frame. This approach locates the outlet guide vanes further downstream from the low pressure turbine exit than prior designs to take advantage of the lower Mach region at this point in order to lower aerodynamic drag penalties associated with swirl removal.

Another object is to incorporate an outlet guide vane assembly within the diffuser design to achieve uniform and complete diffusion within the exhaust flowpath. This is particularly desirable in designs incorporating augmentors and afterburners.

Still another object is to provide outlet guide vanes which act as axial extensions to the support struts thereby allowing the design of a relatively thinner airfoil, that is, an airfoil having a lower thickness to chord length ratio with corresponding reduced aerodynamic blockage.

Yet another object is to provide an outlet guide vane assembly which allows the use of thinner and shorter faired struts having non-cambered symmetrical cross sections aligned with the flow of exhaust gasses to reduce aerodynamic loading and reduce aerodynamic drag.

Another object is to provide an outlet guide vane assembly which allows for a closely coupled low pressure turbine rotor. This results in reduced rotor system weight and increased rotor stiffness for improved rotational vibration characteristics and improved dynamics.

Another object is to provide an outlet guide vane assembly wherein outlet guide vanes are removably mounted in tandem separately from the support struts so that the outlet guide vanes require strength only to support their aerodynamic deswirling loads. This feature allows the use of ceramic or non-metal composite outlet guide vanes, or lower cost and/or lower strength metals.

Briefly, the present invention is generally directed to a medium to high bypass ratio gas turbine engine design which incorporates thin faired structural support struts which are canted to the engine centerline and aligned with the exit swirl flowing from the low pressure turbine. Thin cambered outlet guide vanes are mounted aft or downstream of the support struts and fairings to remove swirl and to reduce aerodynamic blockage while area ruling the strut section for uniform diffusion. Because the outlet guide vanes do not serve as structural frame members, they may be manufactured from non-metals such as ceramic materials for high temperature applications.

The aforementioned objects, features and advantages of the invention will, in part, be pointed out with particularity and will, in part, become obvious from the following more detailed description of the invention, taken in conjunction with the drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
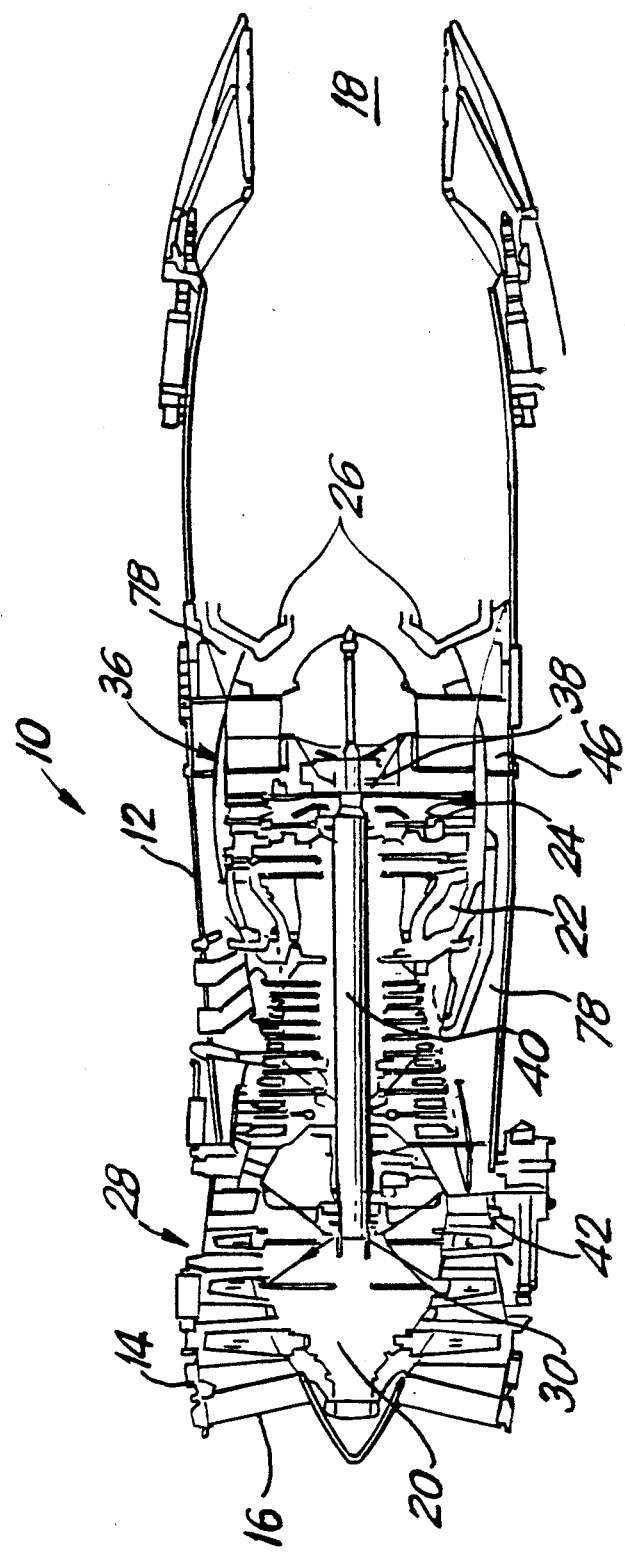
FIG. 1 is a simplified schematic side elevational view, in section, of a gas turbine engine showing the general configuration of the gas turbine engine and the location of the engine frames and afterburner.

A brief description of the major features of a gas turbine engine will aid in the appreciation of the present invention by identifying the location and arrangement of the turbine frame assemblies to which the outlet guide vanes are mounted. Referring first to FIG. 1, a portion of a gas turbine or turbofan engine (10) is illustrated in partial cross-section. The engine (10) includes an outer casing (12) which surrounds an annular flowpath (14) extending axially between an inlet (16) and an exhaust outlet (18) located at opposite ends of the engine (10).

During engine operation, ambient air is drawn into the inlet (16) and is compressed to a higher pressure in a compressor (20), from which the compressed air is discharged into an annular combustor (22) where fuel is burned to produce high energy products of combustion. From the combustor (22), the motive fluid is directed through a turbine (24) where a portion of its energy is extracted to drive the compressor (20), and the fluid is then discharged as a high energy stream through the exhaust outlet (18).

Exhaust gasses exiting turbine (24) may be mixed with additional air (bypass air) in a known fashion and delivered to the region of augmentor or afterburner (26) which injects additional fuel into the exhaust flow. This fuel and air mixture is then ignited to provide an additional propulsive force while exiting through exhaust outlet (18).

To maintain the various components of the engine in their proper relative operating positions, engine frame assemblies are provided for rigidly interconnecting the stationary stator components and for providing bearing supports for the rotor. More particularly, the engine (10) includes a front frame assembly (28) supporting a front bearing (30) and a turbine frame (36) supporting an aft bearing (38). The rotor (40) is rotatably mounted in the bearings (30 and 38).

Each frame assembly (28 and 36) respectively includes a plurality of radial support struts (42 and 46) which project across the annular flowpath (14) to interconnect the inner and outer frame members of the frame assemblies. Since the temperature of the motive fluid flowing through the flowpath (14) changes very rapidly during transient engine operation, substantial thermal stresses can be created in the rigid frame assemblies if the struts are allowed to heat up and cool down at rates differing substantially from those of the inner and outer frame members. This is particularly true with respect to the turbine frame assembly (36) since the exhaust gases which surround the turbine frame assembly are subject to the most rapid and greatest changes in operating temperatures and resulting thermal stresses.

The gas turbine engine (10) briefly described above is typical of the general configuration of many present day gas turbine and turbofan engines and has been described solely to place the present invention in proper perspective. As will become clear to those skilled in the art, the present invention will be applicable to other types of gas turbine and turbofan engines and therefore the engine (10) is merely meant to be illustrative. Accordingly, the outlet guide vane assembly discussed below is illustrated in conjunction with a modified turbine frame assembly analagous to turbine frame (36). However, the present invention is equally applicable to other rigid assemblies, which may also be exposed to high velocity motive fluid experiencing substantial and rapid changes in temperature.

Figure 2:
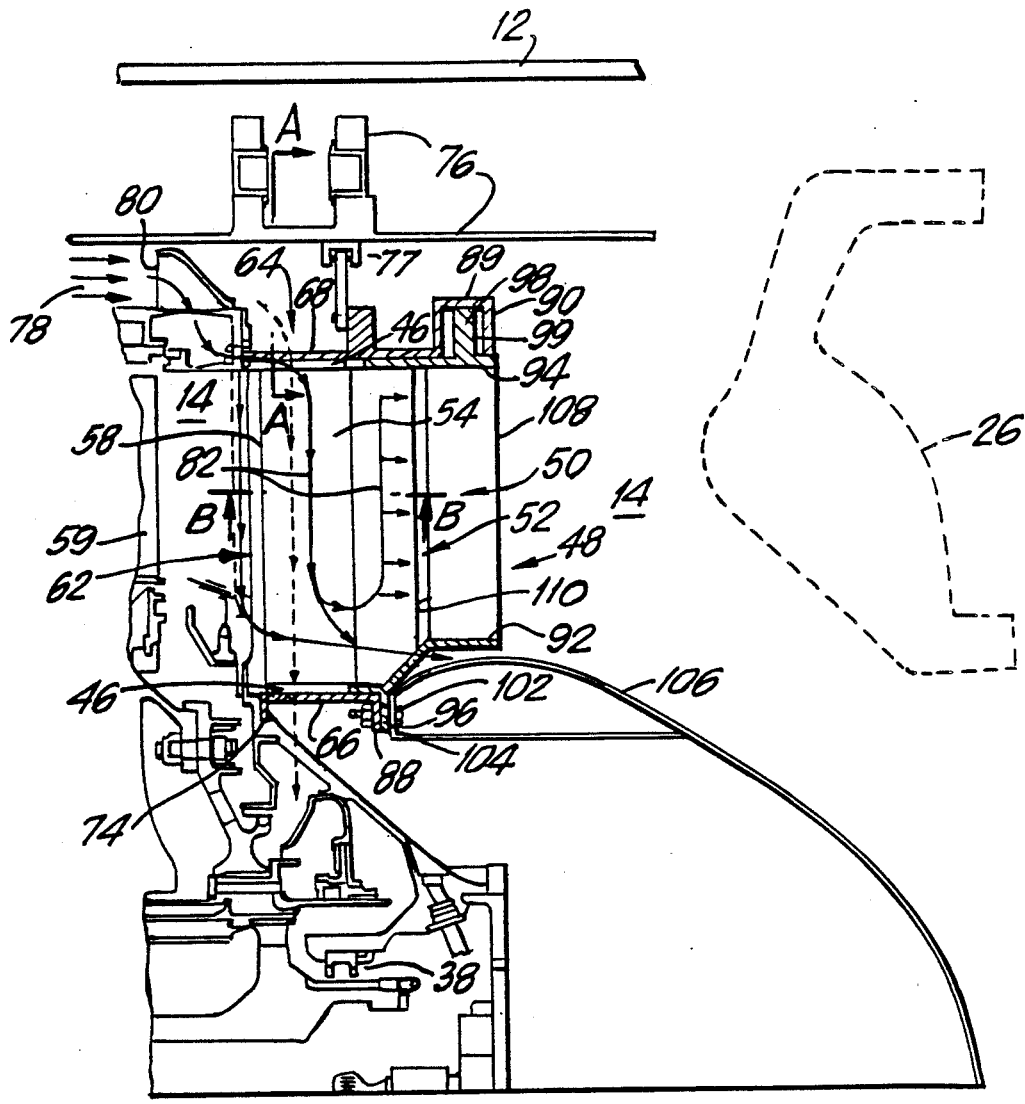
FIG. 2 is a sectioned fragmental side elevation view of the support struts and outlet guide vane assembly of the present invention.

Referring now to FIG. 2, the outlet guide vane assembly (48) of the present invention is shown to include an annular array of outlet guide vanes (50) mounted adjacent to the trailing edge (52) of fairing (54). As further seen in FIGS. 3 and 4, each fairing (54) is formed as a thin-sectioned, symmetrical, non-cambered airfoil surrounding a thin-sectioned internal radial support strut (46). The centerline (56) and leading edge (58) of fairing (54) are preferably aligned with the direction of the swirling flow leaving the low pressure turbine blades (59) to minimize aerodynamic drag pressure losses and flowpath blockage. The preferred alignment of centerline (56) is shown to be about 32 degrees from the longitudinal axis or centerline (60) of the gas turbine engine (10), although this angle may vary from about 25 degrees to 35 degrees depending on the particular application.

Figure 5:
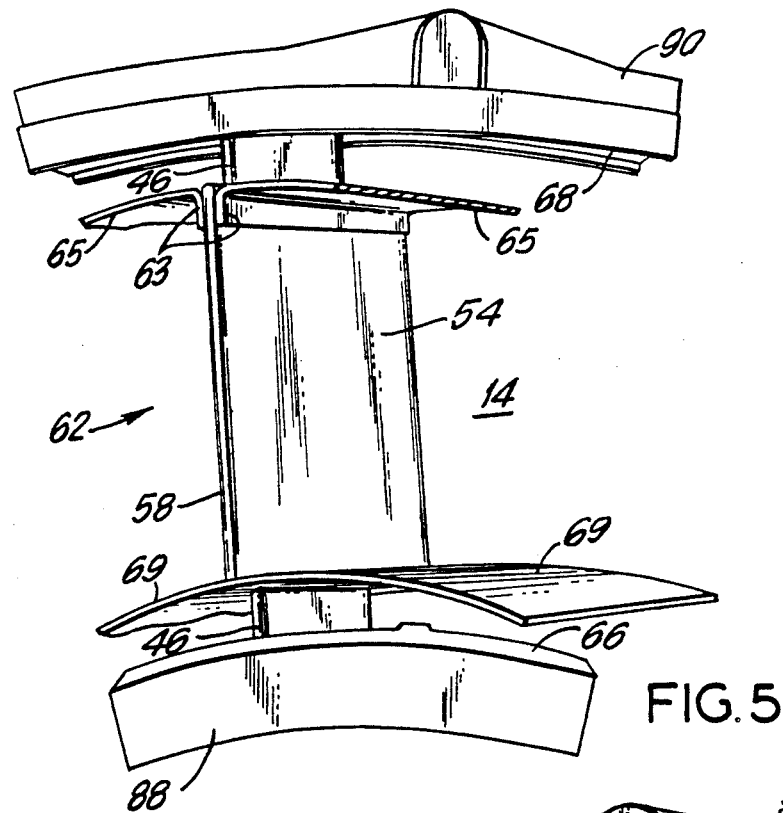
FIG. 5 is a front perspective view of one segment of the fairing and strut assembly.
Figure 6:
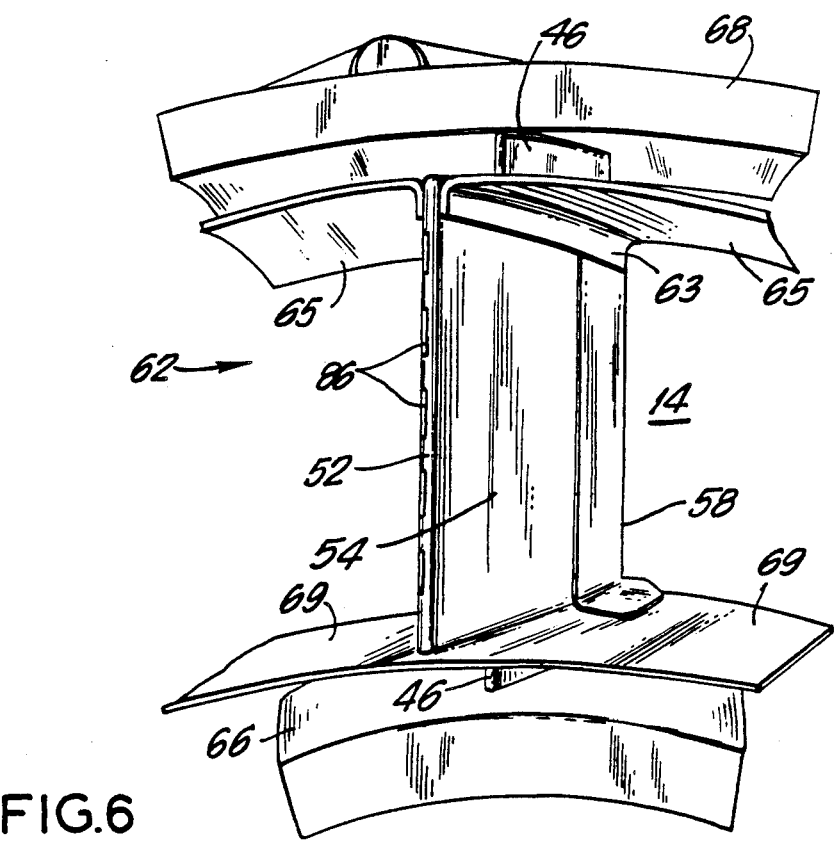
FIG. 6 is an aft view of FIG. 5.

As seen in FIGS. 5 and 6, the fairings (54) and support struts (46) are assembled as individual segments (62). In a typical design, eight segments (62) are joined and mounted in an annular configuration to the turbine engine (10) to form a fairing and strut assembly (64). The fairing and strut assembly (64) delimits the annular flowpath (14) between a radially flanged inner support ring (66) and a radially flanged outer support ring (68). In the embodiment shown in FIG. 2, the eight evenly spaced fairing and strut segments (62) are joined to form an annular spoked array between the inner and outer support rings (66, 68).

As further seen in FIGS. 5 and 6, the flowpath 14 is further defined between outer flowpath liner or fairing 65 and inner flowpath liner 69. The outer flowpath liner 65 is connected to each fairing 54 via radiused elbow members 63 which are in turn secured to the upper side portions of each fairing 54. The upper and lower flowpath liners may be formed from sheet metal and welded or brazed in place.

Figure 3:
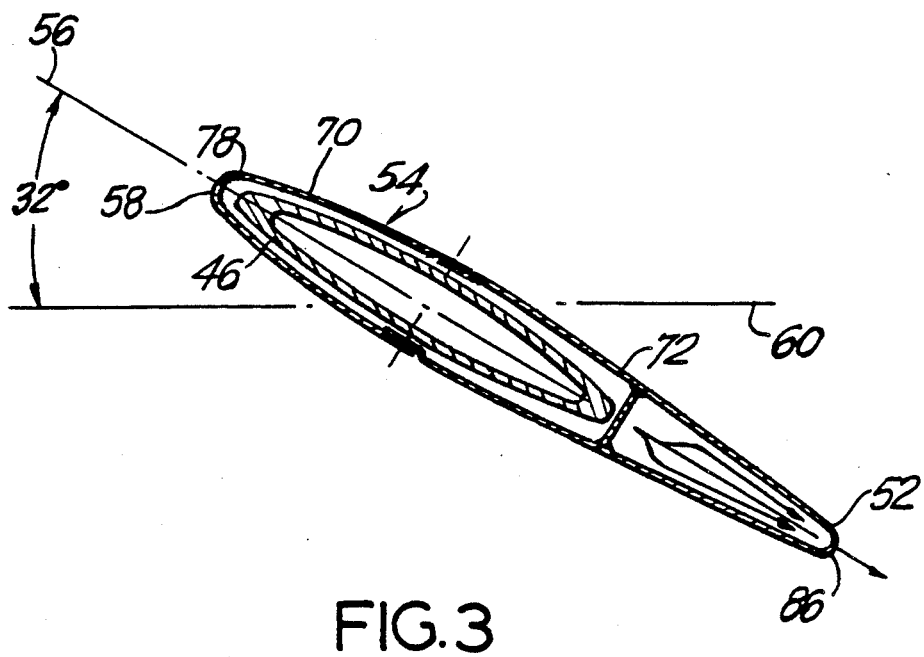
FIG. 3 is a sectional view of the fairing and strut assembly taken through line B—B of FIG. 2.

Each fairing (54) may be constructed from fairing half shell members (70) and (72) as shown in FIG. 3 to permit assembly of the fairings around the inner support strut (46). The entire fairing and strut assembly (64) may be constructed with known techniques and mounted within the engine (10) in a known fashion except for the relative axial tandem arrangement of the fairing and strut assembly (64) and outlet guide vanes (50) as disclosed below.

Figure 2A:
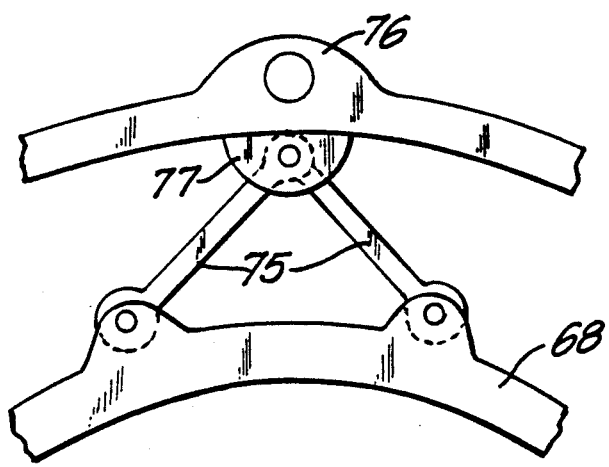
FIG. 2(a) is a fragmental front view of the connection between the outer support ring and outer frame member taken through line A—A of FIG. 2.

Referring again to FIG. 2, the inner support ring (66) may be secured to the engine (10) via inner casing (74) which also serves as a support for aft bearing (38), while the outer support ring (68) may be secured to an engine outer frame member (76). As best seen in FIG. 2(a), the outer support ring (68) is supported from the outer frame member (76) via link members (75) which are pinned within clevises (77). The fairing and strut subassembly (64) is preferably axially aligned over the aft bearing (38) (FIG. 1).

Fan bypass air (78) shown in FIGS. 1 and 2 is directed radially inwardly through a circumferential array of air scoops (80). One air scoop (80) may be provided for each fairing and strut segment (62) to supply cooling air along the double-pass U-shaped coolant flowpath (82). Cooling air enters the top or radial outer end of each fairing and strut segment (62) and is channeled by interior baffles through the coolant flowpath (82) to exit the trailing edge (52) of the fairing (54) through exhaust ports (86) (FIG. 6). This tortuous cooling path ensures efficient cooling of the internal support strut (46) and fairing (54).

The outlet guide vanes (50) may be bolted to a radial flange on either the inner or outer support ring (66, 68) so as to allow free radially-directed thermal expansion. In the embodiment shown in FIGS. 2, 7 and 8, the inner and outer support rings (66, 68) are respectively formed with an inner annular mounting flange (88) and an outer annular mounting channel (89) having an aft flange (90). The outlet guide vanes (50) are provided with inner and outer support rings (92, 94) which also include radially extending inner and outer arcuate mounting flanges (96, 98). As shown in FIG. 2, an axial and radial clearance (99) is provided between the annular channel (89) and flange (98).

Figure 7:
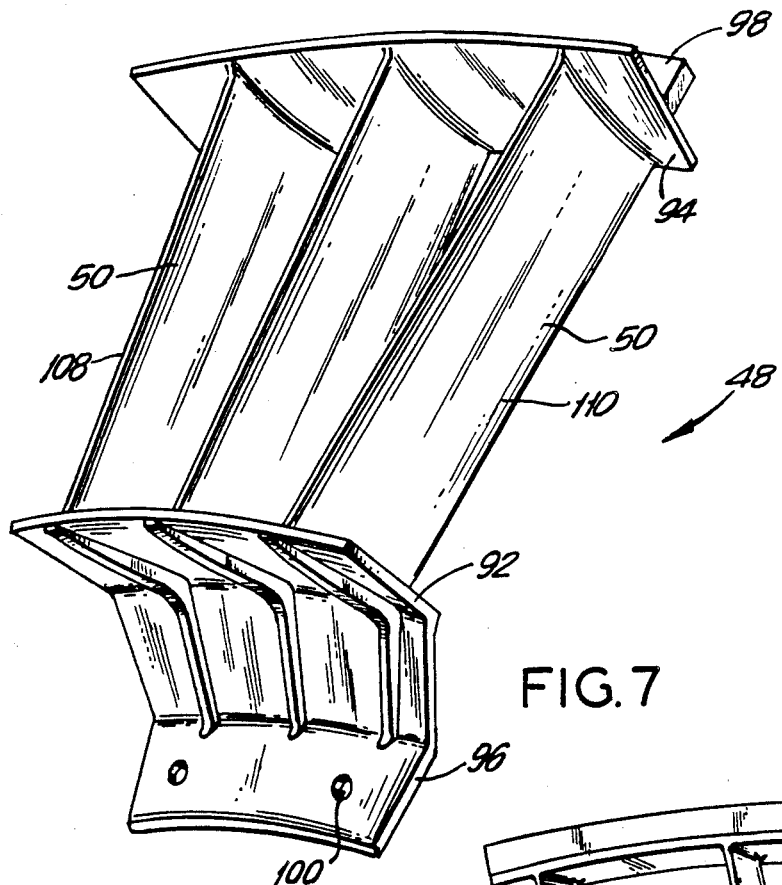
FIG. 7 is a front perspective view of one segment of the outlet guide vane assembly.
Figure 8:
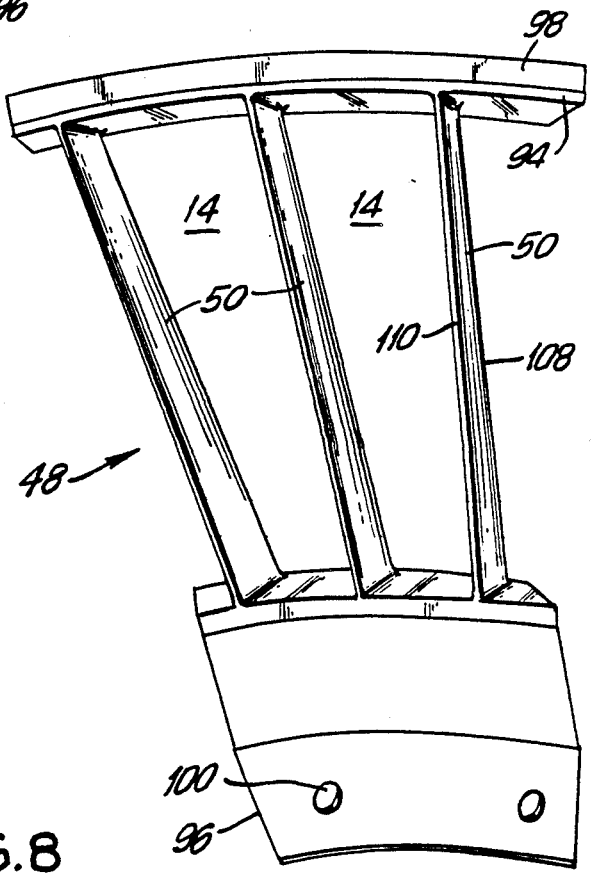
FIG. 8 is an aft view of FIG. 7.

The outlet guide vanes (50) are preferably fabricated as individual segments having three vanes per segment such as shown in FIGS. 7 and 8. When bolted through mounting holes (100) to the fairing and strut assembly (64) via flanges (96) with bolts (102) as seen in FIG. 2, the outlet guide vanes (50) form an annular array of deswirling vanes directly aft of the fairings (54). This mounting assembly may further include a connection to a radial flange (104) of diffuser casing or tail cone (106).

By mounting a plurality of outlet guide vanes (50) aft of the fairing and strut assembly (64), the outlet guide vanes may be dimensioned axially shorter than the fairings (54) and rear support struts (46). Since the outlet guide vanes (50) are preferably shorter than prior outlet guide vanes, they present less aerodynamic drag. Moreover, because the outlet guide vanes (50) are further downstream than in conventional designs the velocity of the exhaust gasses is approximately 15% lower at this point. This further reduces aerodynamic losses.

Prior fairings which were configured to deswirl the exhaust gases were necessarily of long axial length to provide the flow field uniformity necessary for afterburner operation. By placing the outlet guide vanes (50) behind the fairings (54) axially shorter fairings may be used, since the fairings need only satisfy mechanical and structural demands rather than aerodynamic deswirling demands.

Because the outlet guide vanes (50) are not incorporated within or constructed as part of the fairings (54), the outlet guide vanes need not extend across the entire flowpath (14) as do conventional designs. That is, conventional designs require the fairing and outlet guide vanes to completely encase and enclose the support struts to protect the support struts from the hot exhaust gasses. In these prior designs, the width of the combined fairings and outlet guide vanes was substantial since the envelope of the fairing and outlet guide vane airfoil had to accommodate the width of the support strut encased therein. This resulted in significant aerodynamic blockage and pressure loss.

Figure 9:
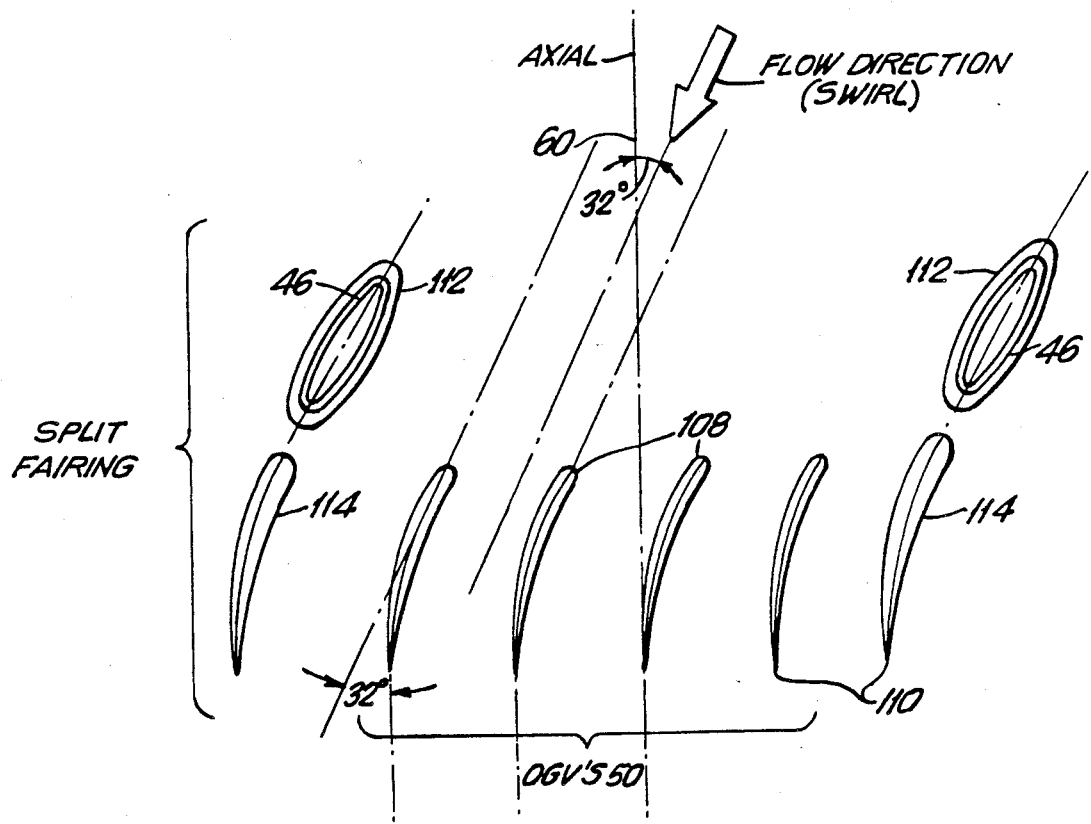
FIGS. 9 and 10 are schematic top projected profiles of variations of the relative alignment of the fairings and outlet guide vanes.
Figure 10:
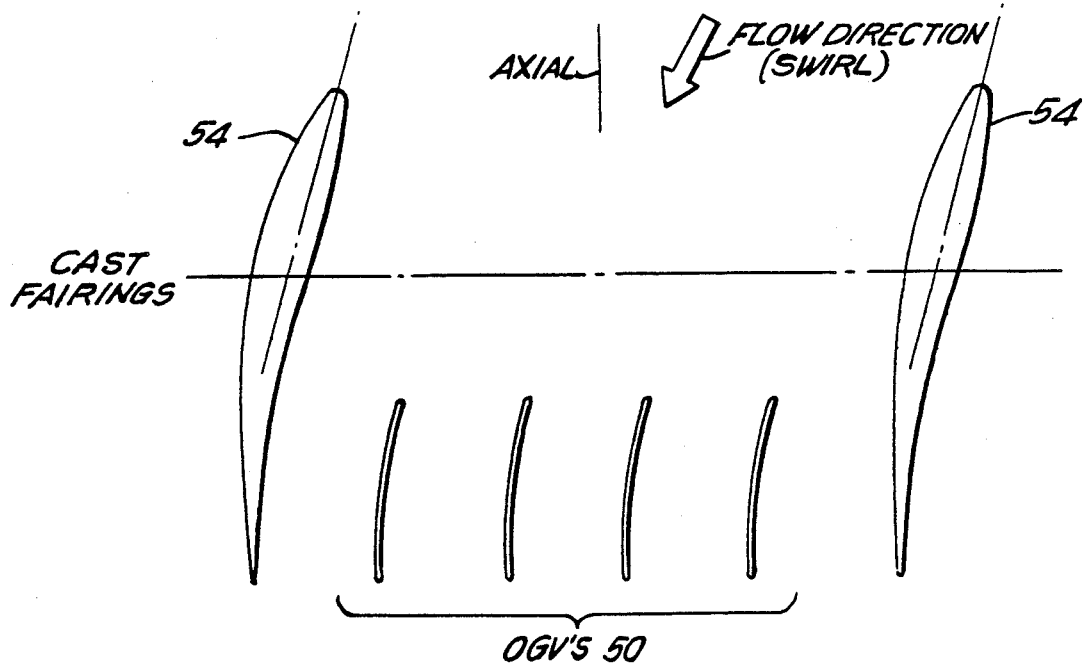

Such drawbacks are avoided by axially separating the fairings (54) and support struts (46) from the outlet guide vanes (50) as shown in FIGS. 3, 9, and 10 wherein the leading edges (58) of the fairings (54) are aligned with the exit swirl to further reduce aerodynamic losses. In addition, since the outlet guide vanes (50) are solid, their cross section is much less than prior hollow designs resulting in lower aerodynamic drag and reduced flowpath blockage.

As stated earlier, it is important to maintain a carefully controlled rate of diffusion as the exhaust gasses exit the low pressure turbine blades (59) and enter the afterburner (26). The exhaust gasses must be evenly diffused and evenly distributed or spread out to achieve complete combustion. In order to diffuse the exhaust gasses their velocity must be reduced. This is achieved by gradually increasing the cross section of the flowpath (14). However, if the cross section increases too rapidly, i.e. if the walls of the flowpath (14) diverge too abruptly, the exhaust gasses will separate resulting in uncontrolled and non-uniform diffusion.

In order to achieve controlled diffusion prior designs required the divergence of the flowpath to extend over a significant axial extent. This necessitated an axially longer and correspondingly heavier turbine engine. The tandem arrangement of the outlet guide of vanes (50) directly behind or downstream of the fairings (54) enables a more rapid overall rate of diffusion in a shorter axial distance without flow separation.

The outlet guide vanes (50) add a controlled amount of blockage within the flowpath (14) to slow down the rate of diffusion and prevent flow separation directly in back of the fairing and strut assembly (64). That is, the cross section of flowpath (14) undergoes a rapid rate of area change at the trailing edge (84) of each fairing (54) and can easily create flow separation. By locating the outlet guide vanes (50) at this critical point, the rate of area change is reduced and the diffusion is controlled so as to avoid flow separation. In effect, the outlet guide vanes can be incorporated within the diffuser design to facilitate the control of diffusion.

The multitude of outlet guide vanes (50), preferably forty or forty-eight in number, serves as an array of small diffusion controllers which slow down the rate of diffusion yet allow a more rapid overall rate of diffusion to be sustained. Each outlet guide vane (50) provides substantial surface area for controlling the diffusion and for turning or deswirling the flow of exhaust gasses. It is therefore more preferable to use many axially short smaller outlet guide vanes (50) behind the fairing and strut assembly (64) than to limit the number of outlet guide vanes as in prior designs to 8, 10, or 12, that is, to the number of support struts (46) required for mechanical strength. These prior designs simply did not provide enough surface area to completely turn and deswirl the exhaust gasses.

Another advantage to mounting a large number of thin outlet guide vanes (50) aft of the fairing and strut assembly (64) is that a greater overall amount of diffusion may take place in a shorter axial distance. This results in an axially compact diffuser section and allows for a more compact and lighter turbine engine. The outlet guide vanes separate the diffuser section into a plurality of small diffusers with a common diffuser length. The presence of the outlet guide vanes (50) within the flowpath (14) thus reduces the rate of diffusion, i.e. the change in flowpath cross-sectional area per change in axial length, while achieving a greater total area change as compared to conventional designs.

A convenient description of the rate of diffusion is the measure of the included angle of an equivalent conical diffuser. An equivalent conical diffuser has the same inlet and outlet area and the same length as the actual diffuser but takes the form of a frustrum of a cone. The included angle described by extending the sides of the cone of the conical diffuser to an apex is a measure of the rate of diffusion. In general, diffuser cone angles in the order of 15° are preferred for efficient diffusion in an acceptable length.

With outlet guide vanes mounted in the diffuser region according to the invention, the diffuser is broken into many small diffusers with a common diffuser length. Thus, the rate of diffusion as measured by the magnitude of the included angle decreases. This permits a greater total area change with the "vaned" diffuser design and results in a reduced rate of diffusion as compared to an unvaned diffuser design.

Thus, the outlet guide vanes may be incorporated into the diffuser design to facilitate area ruling for a controlled diffusion rate. The addition of one vane splits the diffuser into two equivalent diffusers with a cone angle of (initial angle)/$\sqrt{2}$. Therefore, with two vanes the cone angle would be (initial angle)/$\sqrt{3}$, and so forth.

The flow leaving the low pressure turbine blades (59) has a high degree of swirl accompanied by large eddies capable of causing tremendous pressure losses. Without outlet guide vanes, these eddies would simply get larger as they pass through the diffuser. Increasing the flowpath cross sectional area via diverging walls is not enough by itself to remove the eddies and swirl.

In order to uniformly diffuse this type of nonuniform flow for complete combustion, the outlet guide vanes may be "twisted" to match the variable swirl angle of the exhaust gasses. Thus, the angle of incidence of the leading edge of each outlet guide vane (50) may vary as a function of radius to provide even diffusion and a streamlined flow of exhaust gasses entering the afterburner (26). It is also possible to "twist" the fairing and strut assembly (64) in a similar manner for an enhanced deswirling effect.

Referring again to FIGS. 4 and 9, it is seen that not only is each fairing (54) canted at about 32 degrees to the centerline (60) of the turbine engine (10), but the leading edge (108) of each outlet guide vane (50) is also canted at about 32 degrees to directly meet the swirling exhaust flow. Each outlet guide vane (50) is cambered over a 32 degree angle to turn or deswirl the exhaust gasses into a substantially complete axial flow. The trailing edge (110) of each outlet guide vane (50) is thus aligned with the turbine engine centerline (60).

Figure 4:
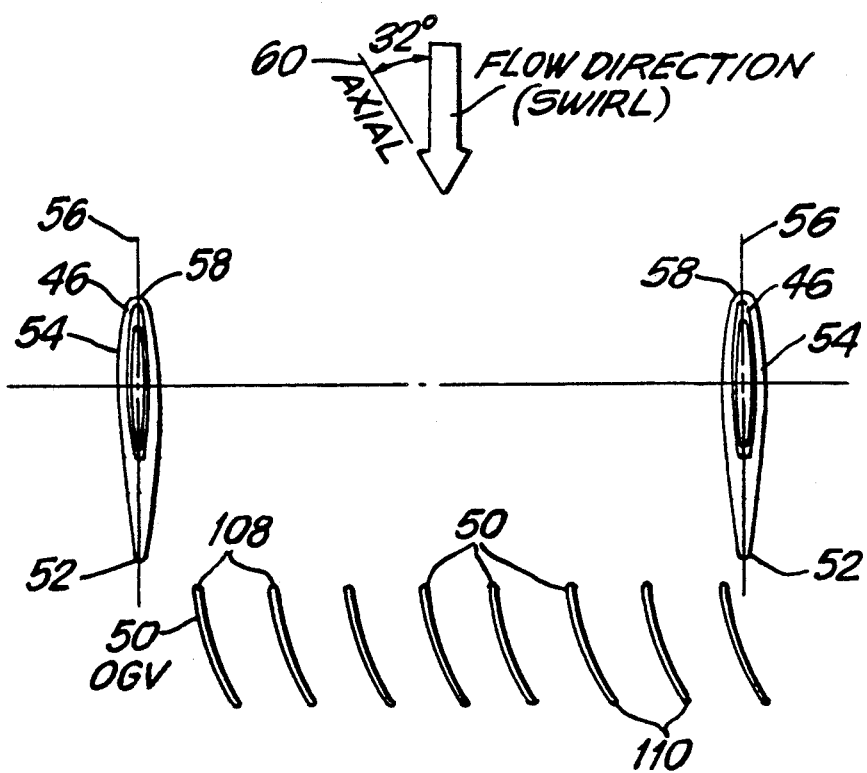
FIG. 4 is a schematic projected sectional view of one embodiment of the outlet guide vane assembly showing the placement of the outlet guide vanes aft of the fairings and support struts.

The outlet guide vanes (50) seen in FIG. 4 each have a uniform thickness while those in FIG. 9 have a nonuniform thickness defining a profile similar to a cambered teardrop. In FIG. 9, the fairings (54) are axially "split" or formed as axially separated airfoils, with the front fairing (112) surrounding support strut (46) and the rear "fairing" (114) acting as an outlet guide vane to deswirl the exhaust gasses. The front fairing (112) is formed with a symmetrical profile and aligned with the swirl to reduce aerodynamic drag while the rear cambered fairing (114) gradually decreases in width to aid in the diffusion process.

Between each rear fairing (114) is aligned a row of outlet guide vanes (50) similar in shape to the rear fairings (114). These outlet guide vanes (50) are not located as far aft as those shown in FIG. 4, since they are aligned between the aft portions of the fairings rather than behind the trailing edge of the fairings. While this design may result in slightly higher aerodynamic drag than the design shown in FIG. 4, this design results in a very axially compact turbine engine with a very rapid rate of diffusion. That is, approximately the same amount of diffusion is achieved in the embodiment of FIG. 9 as that of FIG. 4, but in a shorter length with reduced weight and a slightly higher pressure loss.

The embodiment shown in FIG. 10 is similar to that of FIG. 9 except that the fairings (54) are of a one piece construction and the outlet guide vanes (50) are of uniform width. This design also achieves an additional degree of weight reduction and length reduction over the design of FIG. 4.

Figure 11:
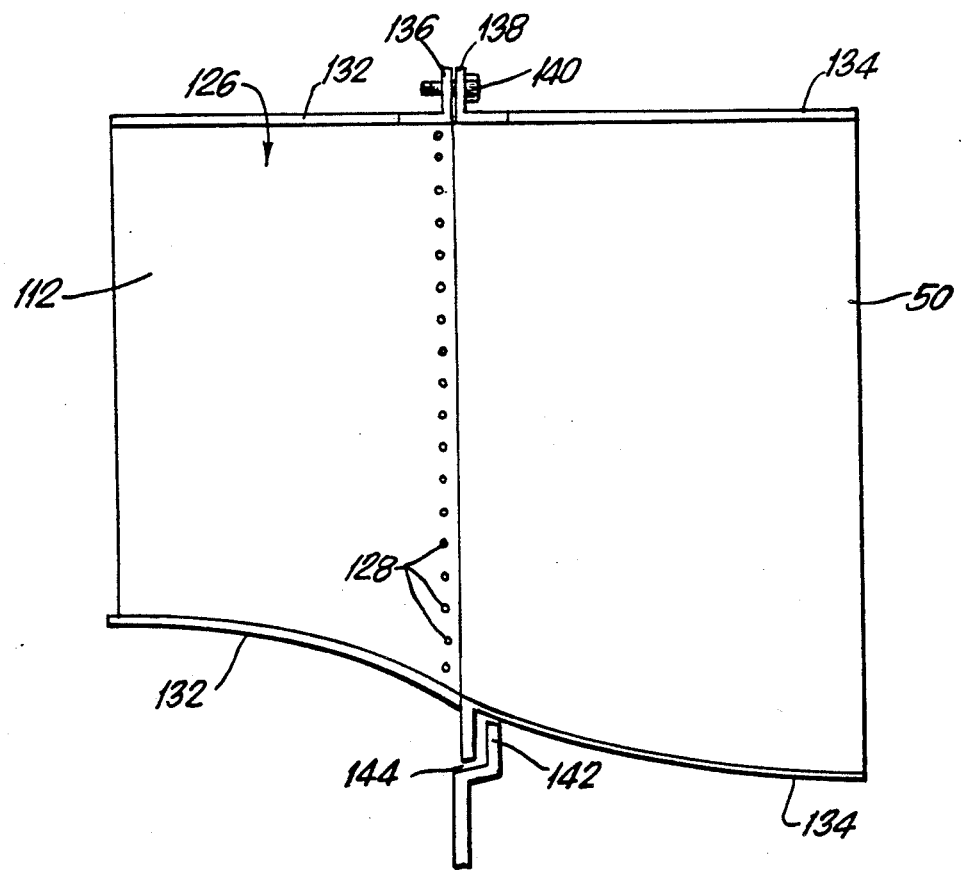
FIG. 11 is a side elevation view of an alternate mounting arrangement of the fairing and outlet guide vanes.
Figure 12:
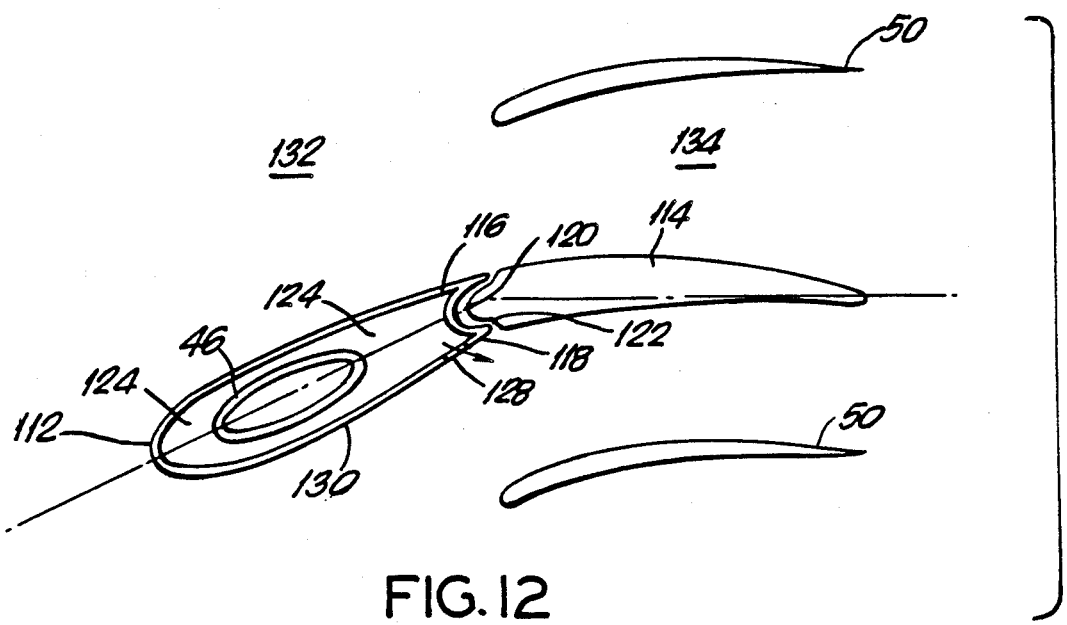
FIG. 12 is a schematic sectional top plan view of FIG. 11.

A modification of the embodiment of FIG. 9 is shown in FIGS. 11 and 12 where the front fairing (112) is formed with an arcuate recess (116) along its trailing edge (118). The rear fairing (114) is formed with an arcuate projection (120) on its leading edge (122) to complement and nest within the recess (114). Both the front and rear fairings (112, 114) are preferably formed as hollow members to provide internal passages (124) for radially directed cooling air (126).

As further seen in FIGS. 11 and 12, the outlet guide vanes (50) are formed as solid members aligned between the rear fairings (114). Cooling air (126) is discharged through exhaust ports (128) formed on the aft high pressure side (130) of the front fairing (112). The front fairings (112) are preferably mounted on a series of individual arcuate segments which are fastened together as a ring (132). The rear fairings (114) and outlet guide vanes (50) are also preferably formed on individual arcuate segments and fastened together as a separate ring (134).

Referring to FIG. 11, the front fairing ring (132) is provided with a radial mounting flange (136) on its outer periphery and the rear fairing and outlet guide vane ring (134) is likewise provided with a radial mounting flange (138) on its outer periphery. The front and rear rings (132,134) may be bolted together at 140 as individual annular members. Preferably, the front and rear rings (132,134) are bolted only at their outer peripheries to allow their free radial expansion induced by thermal gradients. A radially stepped mounting flange (142) may be formed as an extension of the inner casing (74) to provide axial restraint against radial flange (142) formed on the inner periphery of ring (134), while providing a clearance (144) for free radial expansion.

It is preferable to form each fairing and strut assembly (64) as a separate assembly which may be connected to a separate and easily removable outlet guide vane assembly (48). This allows the modification of the outlet guide vanes (50) to suit the deswirling requirements of a particular turbine engine independent of mechanical structural support considerations. That is, since the outlet guide vanes (50) do not provide any significant support to the turbine engine frame (36), any one of several outlet guide vane assemblies may be bolted to the fairing and strut assembly (64). The separate mounting arrangement places all structural support within the support struts (46) so that the outlet guide vanes (50) require strength only to support their aerodynamic deswirling loads. Because the outlet guide vanes (50) do not provide structural or bearing support they can be formed as simple solid uncooled vanes of typical superalloys or of lightweight and low cost ceramic materials.

The ease of separability of the outlet guide vanes (50) from the fairing and strut assembly (64) further allows the interchange of various outlet guide vane designs without disassembly of the turbine engine rotor system. This is particularly important to allow for variations in engine design by selectively mounting outlet guide vanes (50) having varying angles of inclination or offset from the turbine engine centerline (60) to optimize deswirling capabilities of the outlet guide vanes (50) as the swirl angle of the exhaust gasses changes with the various engine designs. This ease of separability even allows the complete removal of all outlet guide vanes from the engine such as in the case where the afterburner (26) is removed from the turbine engine (10).

Still another advantage to the separately mountable outlet guide vanes (50) is the capability of manufacturing the turbine frame (36) which includes the fairing and strut assembly (64) in parallel or concurrently with the outlet guide vanes (50). This allows the turbine engine (10) to be assembled with or without the outlet guide vanes (50).

Figure 13:
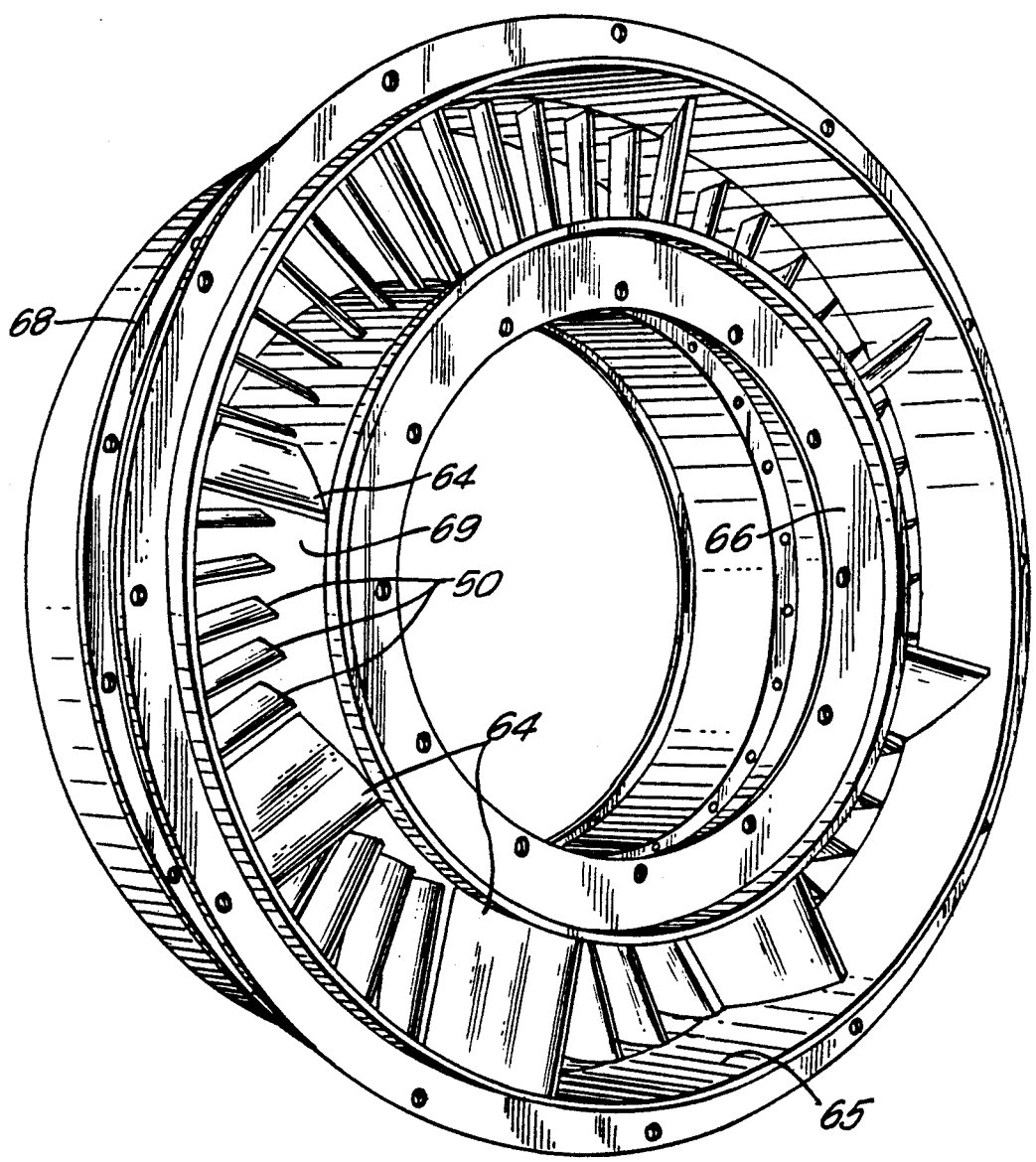
FIGS. 13 and 14 are front and rear perspective views, respectively, of a preferred embodiment of the present invention.
Figure 14:
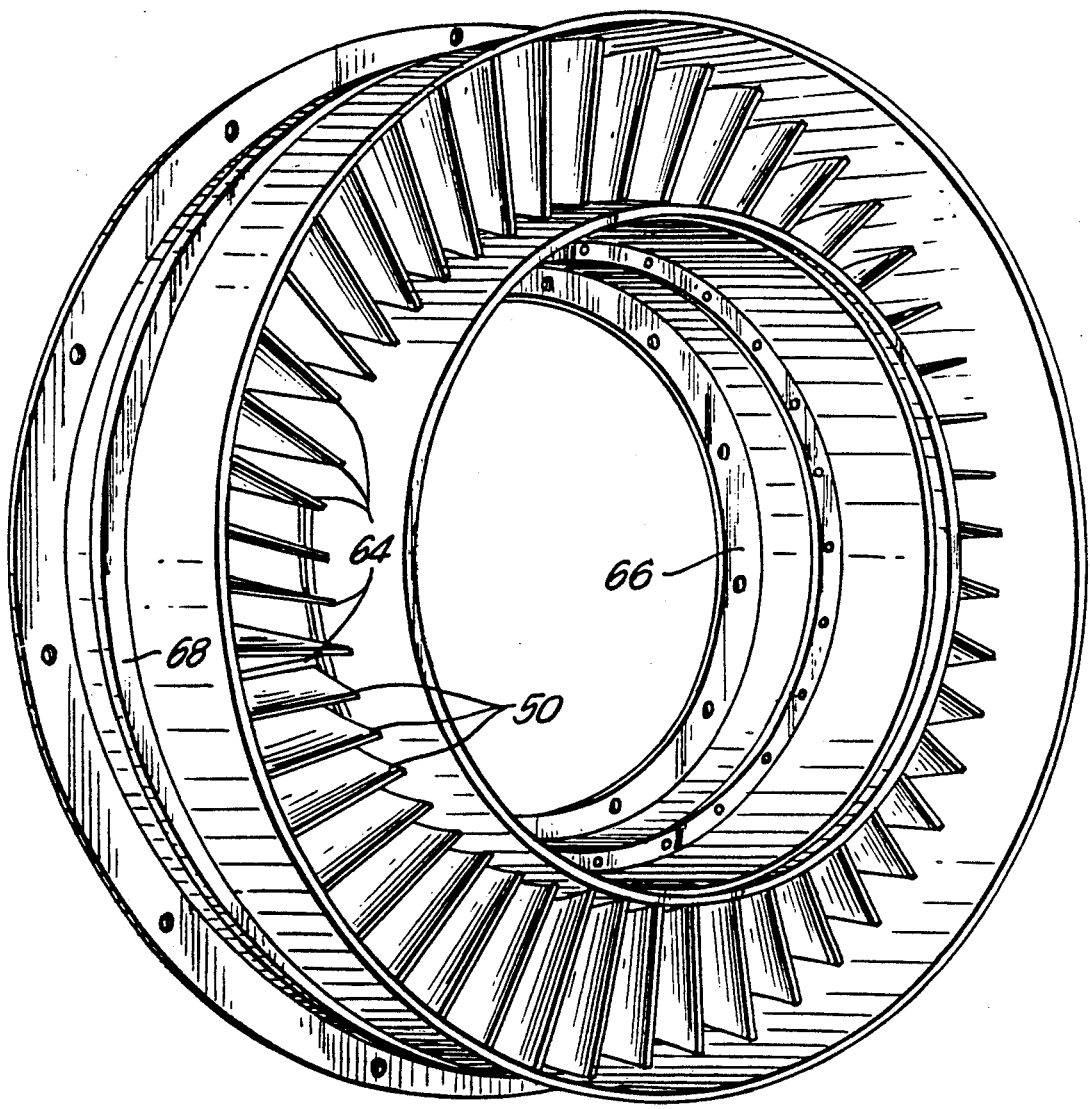

In summary, by locating the outlet guide vanes (50) behind the fairing and strut assembly (64) such as seen in FIGS. 13 and 14, an axially shorter engine (10) may be designed with a diffuser section having improved efficiency over prior designs. Moreover, the present invention locates the outlet guide vanes (50) in a less hostile environment where drag losses are reduced due to a lower velocity of the exhaust gases at this downstream location. By providing more structure upstream in the flowpath (14) more diffusion takes place before deswirling begins.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A turbine assembly having an inner casing, an outer casing, and a plurality of low pressure turbine blades located between said inner and outer casings, said assembly comprising:
   an annular array of radially extending support struts for interconnecting said inner and outer casings aft of said low pressure turbine blades; and
   a plurality of radially extending outlet guide vanes mounted within the turbine assembly aft of said support struts for deswirling exhaust gasses exiting said low pressure turbine blades.

2. The assembly of claim 1, further comprising a first inner annular support operatively associated with said inner casing and a first outer annular support operatively associated with said outer casing, and wherein said outlet guide vanes are mounted between said first inner and outer annular supports to form an outlet guide vane assembly.

3. The assembly of claim 2, further comprising a fairing provided around each of said support struts, a second inner annular support and a second outer annular support, said second inner and outer annular supports supporting said support struts therebetween to form a fairing and strut assembly.

4. The assembly of claim 3, wherein said outlet guide vane assembly is removably mounted to said fairing and strut assembly.

5. The assembly of claim 1, further comprising a fairing mounted around each one of said support struts.

6. The assembly of claim 5 wherein said turbine engine comprises a longitudinal centerline and wherein said support struts are canted with respect to said centerline.

7. The assembly of claim 6, wherein said support struts are canted within a range of 25 degrees to 35 degrees with respect to said centerline.

8. The assembly of claim 5, wherein said fairing is formed with an uncambered symmetrical cross section.

9. The assembly of claim 5, wherein said outlet guide vanes are mounted axially coextensive with a rear portion of said fairing.

10. The assembly of claim 5, wherein said fairing comprises a front fairing member and a rear fairing member axially spaced in tandem with said front fairing member.

11. The assembly of claim 5, wherein said fairing comprises a front fairing member and a rear fairing member nested within a rear portion of said front fairing member.

12. The assembly of claim 3, wherein said outlet guide vane assembly is fixedly mounted to said fairing and strut assembly exclusively along said first and second outer annular supports.

13. The assembly of claim 3, wherein said outlet guide vane assembly is fixedly mounted to said fairing and strut assembly exclusively along said first and second inner annular supports.

14. The assembly of claim 1, wherein said outlet guide vanes are formed as thin, uniformly sectioned solid uncooled vanes.

15. The assembly of claim 1, further comprising afterburner means operatively associated with the turbine assembly.

16. The assembly of claim 1, wherein said outlet guide vanes are twisted to accommodate said exhaust gasses having a swirl angle which varies radially.

* * * * *